US005965072A

United States Patent [19]

Hesler

[11] Patent Number: 5,965,072

[45] Date of Patent: Oct. 12, 1999

[54] MOLDED ARAMID SHEETS

[75] Inventor: Lee James Hesler, Richmond, Va.

[73] Assignee: E. I. du Pont de Nemours and Company, Wilmington, Del.

[21] Appl. No.: 09/153,104

[22] Filed: Sep. 15, 1998

Related U.S. Application Data

[62] Division of application No. 08/894,000, Jul. 17, 1997.

[51] Int. Cl.$^6$ .............................. B29B 9/10; D21F 11/00

[52] U.S. Cl. .............................................. 264/14; 162/146

[58] Field of Search ......................... 264/14, 11; 162/146

[56] References Cited

U.S. PATENT DOCUMENTS

| | | | |
|---|---|---|---|
| 2,988,782 | 6/1961 | Parrish et al. | 18/48 |
| 2,999,788 | 9/1961 | Morgan | 162/146 |
| 3,018,091 | 1/1962 | Duggins | 259/9 |
| 3,062,702 | 11/1962 | Parrish et al. | 162/157 |
| 3,756,908 | 9/1973 | Gross | 162/146 |
| 4,515,656 | 5/1985 | Memeger, Jr. | 162/101 |
| 4,729,921 | 3/1988 | Tokarsky | 428/288 |
| 5,026,456 | 6/1991 | Katz et al. | 162/146 |
| 5,223,094 | 6/1993 | Kirayoglu et al. | 162/145 |
| 5,314,742 | 5/1994 | Kirayoglu et al. | 428/285 |
| 5,482,773 | 1/1996 | Bair | 428/368 |

*Primary Examiner*—Mary Lynn Theisen

[57] ABSTRACT

Aramid sheet material and parts molded therefrom comprising m-aramid fibrids containing up to 10% by weight dyes that are thermally stable up to the glass transition temperature of the m-aramid polymer and p-aramid or m-aramid short fibers.

5 Claims, 1 Drawing Sheet

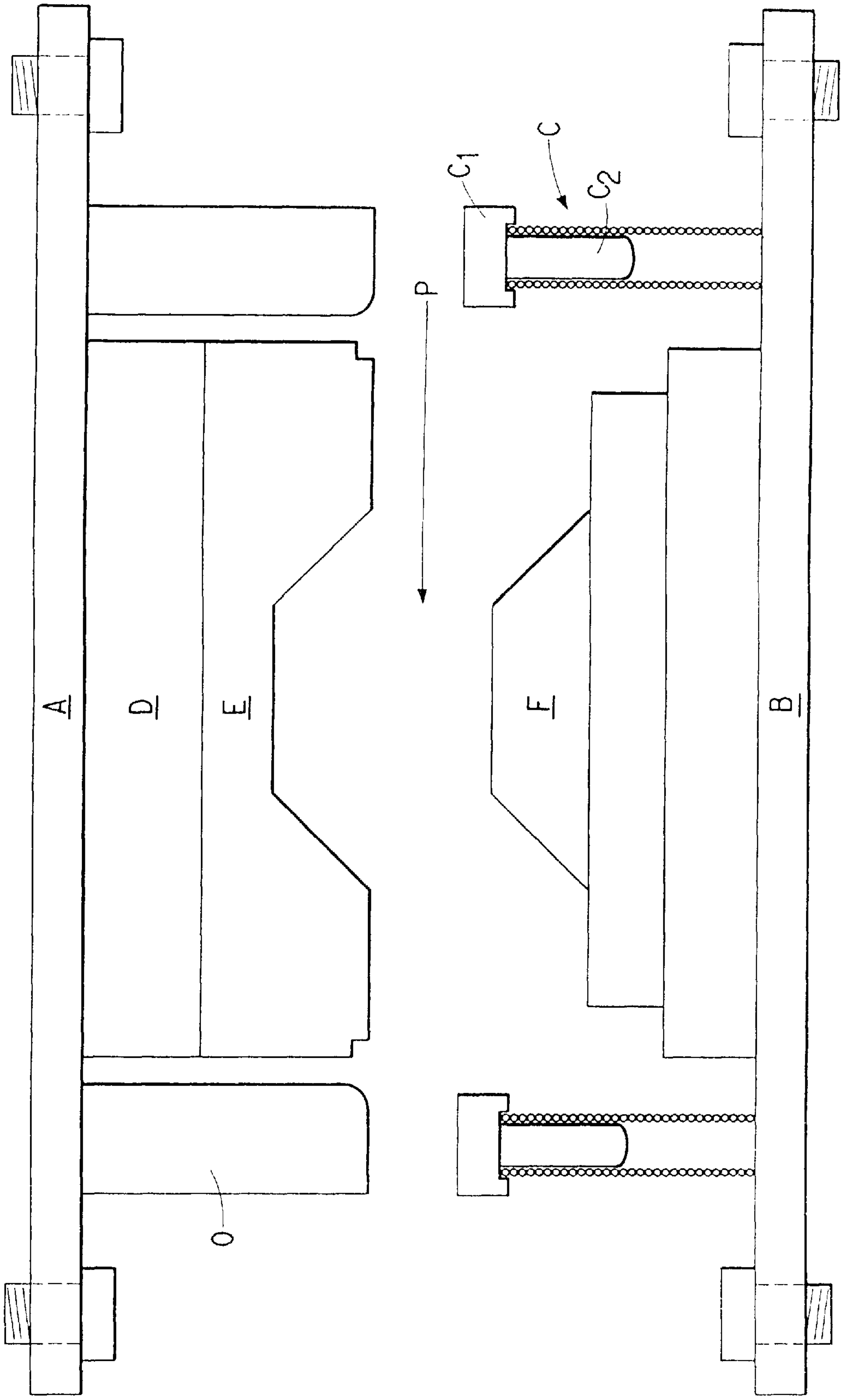
FIGURE

MOLDED ARAMID SHEETS

This is a division of application Ser. No. 08/894,000 filed Jul. 17, 1997, now pending.

The present invention relates to m-aramid fibrids containing dyes or pigments and to sheet and molded products made from sheets containing these colored fibrids.

BACKGROUND OF THE INVENTION

Speaker cones and parts having good acoustical properties made from aramid papers are known. Aramid papers for speaker cones generally combine crystallized p-aramid fibers and amorphous m-aramid fibrids; the fibrids act as a binder for the p-aramid fibers by softening and bonding the fibers when the formed sheets are subjected to high pressure and temperature.

Aramid papers typically have coloring similar to that of the base fiber. Generally, papers made from natural colored p-aramid fiber, such as the fiber known under the DuPont trademark KEVLAR, range in color from golden to cream-beige. Papers made from natural colored m-aramid fiber, such as the fiber known under the DuPont trademark NOMEX, range in color from off-white to light beige. Coloring, other than the natural coloring of aramid papers, has been achieved in the past by using pigmented p-aramid fibers in the make-up of the sheets or by printing a color layer on the surface of the formed sheet.

Often when using aramid papers in many applications or for articles molded from aramid papers, colors other than the natural color of the fibers or fibrids are desired for aesthetic reasons. Molders of various parts, particularly speaker cones and molded parts which are visible in use, normally require materials having some variety of colors, particularly dark shades and black.

Typically, molders use a printing step to impart surface color to the nonwoven aramid sheets before they are shaped into molded parts. Experience has shown that when printed aramid paper is molded, surface color defects occur causing the surface of the molded part to appear to have cracks. Such “cracks” make the appearance of a speaker made with such cones unsatisfactory. These unappealing surface defects arise from a shifting of the surface components of the sheet during the molding process. During molding heat and shear are applied to the sheet to further densify and form the sheet into a specified shape. While under this shearing force, printed fibrids and/or fibers may shift exposing unprinted fibrids and/or fibers from below the surface of the sheet. Areas where the unprinted fibrids or fibers become visible appear to the eye to be cracks in the colored surface. In reality these “cracks” are just unprinted streaks in the paper surface, and although these “cracks” have no effect on the function or performance of the molded parts or speaker cones, they are aesthetically objectionable.

Fibrids filled with activated carbon have been taught by Bair in U.S. Pat. No. 5,482,773, and the use of fillers in the making of fibrids was taught by Morgan in U.S. Pat. No. 2,999,788. The presence of fillers in fibrids tend to alter the mechanical properties of the fibrid. The fibrids of Bair were used as an absorber and had high content (40 to 85 weight %) of activated carbon. Both the fibrids taught by Bair and sheets made from these fibrids were of only fair mechanical quality as a result of the high concentration of carbon filler.

The present invention provides colored fibrids that can be used in the making of colored aramid sheets and molded sheet products. The fibrids of the present invention are colored in such a way that they, and sheet products made from them, are not compromised in mechanical properties. This is of particular importance in considering the performance of a sheet material for use in reproduction of sound such as in speaker parts and cones.

SUMMARY OF THE INVENTION

The present invention provides m-aramid fibrids containing up to 10% by weight dyes wherein the dyes are stable up to or above the glass transition temperature of the m-aramid polymer from which the fibrid is formed.

The present invention also provides aramid sheets made with these fibrids and molded parts made from such sheets.

In the formation of sheets, the fibrid of the present invention are combined with short p-aramid or m-aramid fibers. P-aramid fibers are preferred to give the desired mechanical properties to the sheet.

Parts may be molded from the sheet of the present invention in a variety of shapes and forms, but molded parts for acoustical devices, such as speakers (cones and parts) are of particular importance.

The present invention also provides a method to make aramid sheet material of various colors and molded parts therefrom comprising the steps of:

(a) forming a solution of m-aramid polymer in a solvent;

(b) extruding the mixture into a non-solvent under shear conditions to form fibrids;

(c) washing the fibrids in water to remove the solvent;

(d) mixing the wet fibrids with water to dilute the fibrid concentration and adding a dye or pigment to the water fibrid mixture wherein the dye is thermally stable up to or above the glass transition temperature of the m-aramid polymer;

(e) heating the mixture from step (e) for a time sufficient for the fibrid to absorb the dye or pigment and develop color;

(f) mixing the colored fibrids with aramid fibers suitable for forming sheet material;

(g) forming and drying the sheet material; and (h) forming the sheet material into a part by molding. Preferred molded parts include speaker cones: tweeters, mid-frequency cones and woofers.

BRIEF DESCRIPTION OF DRAWINGS

The FIGURE shows a molding apparatus used to produce speaker cones.

DETAILED DESCRIPTION

The present invention provides a colored m-aramid fibrid. This fibrid may be used in the formation of aramid sheet products and molded parts to provide aesthetically pleasing colored products.

In particular the aramid sheets containing fibrids of the present invention may be pressed into molded parts such as speaker parts without creating visible surface defects having the appearance of “cracks” in the molded surface.

The fibrid of the present invention incorporates as the primary color source, an organic dye or an organic pigment. The pigments and dyes that may be used in the present invention are those that are thermally stable up to or above the glass transition temperature of the m-aramid polymer from which the fibrid is formed, and are those pigments or dyes that are absorbed by the fibrid in amounts sufficient to cause the fibrid to develop the desired depth of color.

In the present invention, the fibrids are colored in the paper making process so that there are little if any additional process costs other than the cost of the color source.

Typically in a process to make aramid paper, the never dried m-aramid fibrids are diluted with water and held in a chest before being mixed with the aramid short fiber and further diluted with water enroute to the paper machine. The fibrids of the present invention are mixed with dye while in a holding chest. There the fibrids may be heated and held for a time sufficient to absorb dye and develop color. It is preferable in a commercial operation that the dye or pigment be selected such that it is exhausted (or fully incorporated in the fibrid in the case of a pigment) from the mixture before the fibrids are further processed into the sheet. When the dye or pigment is exhausted, there will be no free dye or pigment in other process steps, nor will there be a need to recover or dispose of free dye or pigment.

The fibrids of the present invention may be mixed with p-aramid fibers or m-aramid fiber to make an aramid paper. The formed sheets may be calendered, partially calendered or be provided as uncalendered sheets to molder for making molded products.

In the molding operation, heat and pressure are applied to the sheet, thus molding serves the same purpose as calendering in developing the ultimate strength properties of the sheets, but since molding may require sheets of varying stiffness uncalendered, partial or full calendered sheets may be needed so that the sheet meet the requirements of the molder.

In the production of papers for speaker cones, it has been found that the preferred sheet composition is 50% by weight m-aramid fibrids and 50% by weight p-aramid short fibers.

Aramid as used herein means a polyamide wherein at least 85% of the amide (—CONH—) linkages are attached directly to two aromatic rings. Additives can be used with the aramid and up to 10% by weight of other polymeric material can be blended with the aramid or copolymers can be used having as much as 10% by weight of another diamine substituted for the diamine of the aramid or as much as 10% by weight of another diacid chloride substituted for the diacid chloride of the aramid.

M-aramid are those aramids where the amide linkages are in the meta position relative to each other, and p-aramids are those aramids where the amide linkages are in the para position relative to each other. The preferred m-aramid for the present invention is poly(m-phenylene isophthalamide); the preferred p-aramid is poly(p-phenylene terephthalamide).

The term fibrid as used herein means a non-granular film-like particle of the m-aramid polymer made by the precipitation of the m-aramid from a solution by extruding the polymer solution into a non-solvent while under shear.

Colored sheet material made according to the present invention retains its color and its surface appearance no matter what molding process is used to form this material into a part. In some cases, molded parts or calendered sheets may appear to have a darker shade of color than that of the sheet from which the part was formed. This color shift is due to the differences in the surface roughness and the light scattering of the uncalendered compared to the molded (calendered) surface of the sheet or the molded part.

In the formulation of the desired shades of color of the sheet material and parts molded therefrom, fibers used in paper making may be used with their natural color, or the fibers may also be dyed or pigmented. The combination of natural colored fibers with dyed fibrids results in papers, sheet material and molded parts having a marbled appearance. Marbling essentially disappears if the fibers are dyed or pigmented to the same color as the fibrids. The combination of colored fibers and fibrids may be used to produce many varied and interesting color patterns particularly if the fibers and fibrids are dyed or pigmented so that each is a different shade or even a different color.

A wide range of organic dyes can be used to color the fibrids, including basic, acid, disperse and metallized. However, most end uses require that the colored papers or sheet material be calendered or molded. In these processes, the colored papers or sheet material are subjected to temperatures approaching the glass transition temperatures of the m-aramid fibrids, and some dyes may be thermally degraded such that they darken or char loosing their color qualities. In the instance where color degradation may be a problem, it is recommended that metallized dyes be used to color the fibrids since they show minimal thermal degradation and excellent exhaustion. Heat stable pigments, or other types of dyes could be used as long as the color of the paper or sheet material, after such high temperature treatments, is desirable for use.

Representative dyes useful in this invention include dyes such as those sold under the following trademarks of Ciba-Geigy of Andsley, N.J.: IRAGALAN Black BGL (neutral metallized); NEOLAN Black WA 140 (acid metallized); TERASIL Black HTG (disperse); TERASIL Blue GBT (Disperse); TECTILON Red 2B (Acid); as those sold under the trademark of Clariant of Charlotte, N.C.: NYLOSAN Blue FML (Acid); NYLOSAN Brilliant Green (Acid); those sold under the trademark of Burlington of Burlington. N.C.: BURCOCRYL Black R dye and Acid Blue 25 (Acid).

Although dyes are preferred for coloring fibrids, some pigments may also be acceptable for use. Pigments having the required thermal stability and which are adequately retained by the fibrid may also be used to color the fibrid.

The concentration of the dye or pigment in the fibrid is less than 10% by weight and preferably less than 5%.

The formation of fibrids and papers containing fibrids and fiber are well known. Fibrid production is disclosed in U.S. Pat. No. 2,988,782 to Parrish et al., U.S. Pat. No. 2,999,788 to Morgan, and U.S. Pat. No. 3,018,091 to Duggins.

The formation of various aramid papers is disclosed in U.S. Pat. No. 3,756,908 to Gross, U.S. Pat. No. 4,729,921 to Tokarsky, and U.S. Pat. Nos. 5,314,742 & 5,223,094 to Kirayoglu et al.

The concentration of fibrid and fiber materials used in forming the sheets of the present invention may be of any range that is suitable for the end use of the paper, sheet material or the molded article. Generally known concentrations of fibrids and fibers in aramid papers provide a range that is wide enough for the formulation of the desired shades of color and color effects of the present invention while allowing the paper or sheet material to maintain all other physical properties for end use applications.

As noted above, papers preferred for molding speaker parts contain 50% by weight fibrids and 50% by weight p-aramid fibers. The p-aramid fibers do not take up dye under the conditions of paper making, thus for speaker parts made using unpigmented p-aramid fiber, the final color will be the result of the combination of the yellow color of the p-aramid fiber and the dyed or pigmented m-aramid fibrid. The p-aramid fiber may be colored by pigmenting the polymer solution from which the fiber is extruded. If the p-aramid fiber is pigmented, color combination may be made, or the color of the fiber and fibrid may be matched.

Generally in the manufacture of speaker cones, papers are formed on a paper machine but are not subsequently calendered using high temperatures and pressure. This uncalendered paper, containing the dyed fibrids, is molded using high temperatures and pressure into speaker cones particularly tweeters (high frequency) and mid-range (mid-frequency) cones and woofers (low frequency).

Molding Procedure

The Figure shows a typical speaker part mold. The mold blocks are attached to a top plate A and a bottom plate B. The top block is formed from a spacer D and a stationary opposer and ring O. The bottom block has a slip ring C, mounted on springs $C_2$ forming assembly C, so that the bottom block can be pressed into the top block of the mold. The top block E has a recessed section, the actual mold, which forms one face of the speaker part surface. The bottom block has an extended section F, the die, which forms the other face of the speaker part. The paper is passed along the path P that is between the two blocks of the mold, and as the blocks are pushed together at the desired pressure and temperature, the paper is formed into the part.

Typical molding conditions for speaker parts conditions are:

| | |
|---|---|
| Temperature | 520–600° F. |
| Pressure | 10–50 tons |

In the case of speaker parts, the molded cones are removed from the die, finished, and assembled into speaker systems and tested for performance. Speaker cones of the present invention have color and appearance that are aesthetically pleasing, and the speakers, using these cones, provide excellent sound quality from low to high frequencies. The cones of the present invention are responsive with low distortion.

The following Examples illustrate the present invention, but are not intended as a limitation of the invention. In the Examples below, some colored papers and dyes are identified as not being recommended for use in making speaker cones. They may be fully acceptable for use in other applications

EXAMPLES

Example 1

This examples illustrates various papers made using dyed fibrids and the importance of heat stability of the dyes in the manufacture of speaker cones or other molded or calendered products requiring heat treatments at temperatures near the glass transition temperature of the m-aramid fibrid.

In each sample shown below, poly(m-phenylene isophthalamide) fibrids were dyed in water solutions of 3 to 6% by weight dye based on the weight of fibrids at 70° C. for 60 minutes. The dyed fibrids were combined with poly(p-phenylene terephthalamide) floc at a 50/50 weight ratio and paper hand sheets of approximately 2 oz/sq.yd were made. The hand sheets were cut in half and one half hot pressed in a flat press at 280° C. (535° F.) at 1000 psi for 1 minute. These conditions of temperature and pressure were chosen to simulate the highest temperature conditions used in molding or calendering the papers.

| | | Color Strength, k/s | | Initial | Final |
|---|---|---|---|---|---|
| Sample | Dye | Formed | Pressed | Color | Color |
| 1 | Blue GLK* | 3.15 | 0.11 | Blue | Beige |
| 2 | " | | | Blue | Beige |
| 3 | " | | | Blue | Beige |
| 4 | Red GL** | 1.83 | 0.88 | Red (pink) | Red (darker) |
| 5 | " | | | Red (pink) | Red (darker) |
| 6 | " | | | Red (pink) | Red (darker) |
| 7 | Burococryl Black R | | | Green | Purple |
| 8 | " | | | Green | Purple |

*Blue No. 54 available from Crompton and Knowles Charlotte, NC.
**Red No 29 available from BASF, Textile Colors Charlotte, NC.

Color strength was measured as K/S using a Chroma Sensor Spectrophotometer made by datacolor International of Charlotte, N.C. K/S was measured for each sample at the wavelength of peak reflectance determined by the spectrophotometer.

Under conditions used to make speaker cones, blue basic dyes are not stable, but these dyes could be suitable for uses that do not require the molding conditions described above. Although showing better color strength when pressed than the blue dyes, the red basic dye was not deemed suitable for speaker cones.

The combination of a basic black dye and the golden para-aramid fiber resulted in a paper having a green color. Upon heating, the blue component of the black dye was destroyed leaving the red which gave it the paper a purple color. This papers was not acceptable for speaker cones since the final color was the result of thermal degradation, it is unlikely that this color could be consistently reproduced as would be required for commercial production.

Final color of the sheet material or molded paper is dependent on the temperature conditions used in sheet processing and molding. Often times one cannot predict the final color that will be produced in the sheet or molded part. Although it may appear straight forward, if one only considers the heat stability of the dyes or pigments and the formulation of the color components in the dyes or pigments, it is surprising that any uniform color is achieved by merely coloring the fibrids used in the paper making process since during the steps in the process, not only is the dye or pigment subject to conditions that may result in a color change, but also the fibrid distribution in the sheet may vary with processing conditions.

Example 2

Eight aramid hand sheets were prepared as in Example 1 from poly(p-phenylene terephthalamide) floc and poly(m-phenylene isophthalamide) fibrids dyed using the following acid, disperse, and metallized dyes.

1. IRGALAN Black BGL (neutral metallized)
2. NEOLAN Black WA 140 (acid metallized)
3. TERASIL Black HTG (disperse)
4. Acid Blue 25 (Acid)
5. NYLOSAN Blue FML (Acid)
6. TERASIL Blue GBT (Disperse)
7. NYLOSAN Brilliant Green (Acid)
8. TECTILON Red 2B (Acid)

As in Example 1, the fibrids were dyed at 70° C. for 60 minutes and 3–6% dye (based on weight of fibrids) was used in each case. Dye exhaust was good for the neutral metallized and disperse dyes with #1 being the best (water almost clear). #3 was the next best. The level of exhaust was considerably less with the acid dyes, most likely because they are ionic and much more soluble in water.

These papers were pressed as in Example 1, and all samples were deemed acceptable for use in manufacturing speaker cone parts, but the neutral metallized dyes are preferred for their thermal stability and exhaustion.

It is important to note that with even stable dyes, the thermal history of processing plays a part in the development of the final color. Colors may be matched exactly and consistently when the same dying conditions are used, and the samples have the same thermal history. Thermal history means the temperature conditions of molding and calendering, including the temperature and the time the paper is exposed to that temperature. Thermal history is especially important with dyes. All dyes are predominately organic in character. Temperature of molding speaker cones are high, and in commercial processing temperature control may not be as precise as desired. This combination of imprecise control and high temperatures may lead to differences in thermal history with even the most stable dyes. Also with the changes in the gloss and surface smoothness of the paper on pressing, there may also be shifts in the observed color of the paper.

Example 3

Refined poly(m-phenylene isophthalamide) fibrids are prepared using standard refining equipment and processes. Dye was added to the fibrids while in a holding tank at a consistency of 0.6%. BURCOCRYL Black R dye from Burlington was added at a 4% concentration based on solids. This dye is a blend of several colors to produce black. As noted below, not all of the component colors of this dye were stable up to 279° C. Thus, this dye is limited in the temperature to which it may be processed.

The fibrids were allowed to dye for ~30 minutes at room temperature. The fibrids were then blended with poly(p-phenylene terephthalamide) floc at a ratio of 1:1 so that the paper would have a concentration of 50% by weight fibrids. A 5.75 oz/yd$^2$ speaker paper was then formed on a paper machine. The paper was then calendered and used to produce speaker parts with a gray-green marbled appearance. The gray-green color was a result of the low level of dye used and the yellow color of the p-aramid fibers in the paper. When the paper was pressed for 1 minute at 1000 psi and 232° C., the gray-green color resulted. When the paper was pressed at 279° C. the color of the paper was red. This change in color seemed to result from the decomposition of a blue component of the dye. This dye is recommended only for use a lower pressing temperatures, that is those not in excess of 232° C.

The properties of the paper formed and calendered were as follows:

| Property | Formed | Calendered |
|---|---|---|
| Basis Weight, oz/yd2 | 6.0 | 5.8 |
| Thickness, mils | 40 | 9.9 |
| Density, g/cc | 0.20 | 0.79 |
| Break strength, lb/in* | 21/15 | 83/70 |
| Elongation, %* | 1.1/1.3 | 1.9/2.0 |
| Modulus, kpsi* | 428/256 | 523/461 |

-continued

| Property | Formed | Calendered |
|---|---|---|
| Elmendorf Tear, g* | 686/887 | 1103/1126 |
| Gurley porosity, sec | 54 | >108 |

*data is reported machine direction/cross machine direction.

The papers reported above were calendered at a temperature of 350° C. and 480 pli at a line speed of 10 feet per minute. Under these processing conditions, the dye demonstrated in this example is not recommended for use in making speaker papers.

Example 4

The papers were formed as in Example 3 but with a basis weight of 2.5 oz/yd$^2$. These were converted into speaker parts directly or after calendering.

The properties of the paper formed and calendered were as follows:

| Property | Formed | Calendered |
|---|---|---|
| Basis Weight, oz/yd2 | 2.6 | 2.7 |
| Thickness, mils | 17 | 4.8 |
| Density, g/cc | 0.20 | 0.76 |
| Break Strength, lb/in* | 12/11 | 42/39 |
| Elongation, %* | 1.0/1.4 | 2.1/2.0 |
| Modulus, kpsi* | 267/186 | 507/526 |
| Elmendorf Tear, g* | 293/235 | 417/366 |
| Gurley porosity, sec | 26 | >180 |

*data is reported machine direction/cross machine direction.

The papers reported above were calendered at a temperature of 325° C. and 480 pli at a line speed of 10 feet per minute. Under these processing conditions, the dye demonstrated in this example is not recommended for use in making speaker papers.

Example 5

Using the paper from Example 4, a two ply paper was prepared by first calendering the paper to make a two ply sheet which was then made into speaker components.

The properties of the paper formed and calendered were as follows:

| Property | Calendered |
|---|---|
| Basis Weight, oz/yd2 | 10.9 |
| Thickness, mils | 16.8 |
| Density, g/cc | 0.86 |
| Break Strength, lb/in* | 246/243 |
| Elongation, %* | 3.3/2.7 |
| Modulus, kpsi* | 521/671 |
| Elmendorf Tear, g* | 2262/2260 |

*data is reported machine direction/cross machine direction.

The papers reported above were calendered at a temperature of 350° C. and 480 pli at a line speed of 10 feet per minute. Under these processing conditions, the dye demonstrated in this example is not recommended for use in making speaker papers.

Example 6

Papers were prepared using IRGALAN Black BGL (neutral metallized dyes) which when pressed show very little thermal degradation at 270° C. The color of the papers after molding was gray-green. This dye showed excellent performance and is recommended for use in making speaker papers.

The properties of the paper formed were as follows:

| Property | Formed |
|---|---|
| Basis Weight, oz/yd2 | 1.3 |
| Thickness, mils | 10.8 |
| Density, g/cc | 0.16 |
| Break Strength, lb/in* | 5.4/5.1 |
| Elongation, %* | 1.6/1.9 |
| Modulus, kpsi* | 78/65 |
| Elmendorf Tear, g* | 103/113 |
| Gurley porosity, sec | 6 |

*data is reported machine direction/cross machine direction.

Example 7

Paper was made as described in Example 1 except IRGALAN Black BGL dye was used and the paper was formed at a nominal basis weight of 1.44 oz/yd$^2$. The color performance of this dye was excellent and it is recommended for use in speaker papers.

The properties of the paper formed were as follows:

| Property | Formed |
|---|---|
| Basis Weight, oz/yd2 | 1.5 |
| Thickness, mils | 12.3 |
| Density, g/cc | 0.17 |
| Break Strength, lb/in* | 6.4/6.0 |
| Elongation, %* | 1.6/1.9 |
| Modulus, kpsi* | 92/74 |
| Elmendorf Tear, g* | 128/136 |
| Gurley porosity, sec | 6 |

*data is reported machine direction/cross machine direction.

Example 8

Paper was made as described in Example 7 except the nominal basis weight was 1.88 oz/yd$^2$.

The properties of the paper formed were as follows:

| Property | Formed |
|---|---|
| Basis Weight, oz/yd2 | 1.9 |
| Thickness, mils | 15.6 |
| Density, g/cc | 0.17 |
| Break Strength, lb/in* | 8.4/7.9 |
| Elongation, %* | 1.6/2.0 |
| Modulus, kpsi* | 121/95 |
| Elmendorf Tear, g* | 194/204 |
| Gurley porosity, sec | 8 |

*data is reported machine direction/cross machine direction.

Example 9

The 3 plys of the paper of Example 6 were calendered to give a nominal 3.75 oz/yd$^2$ basis weight sheet.

The properties of the paper formed were as follows:

| Property | Formed |
|---|---|
| Basis Weight, oz/yd2 | 3.82 |
| Thickness, mils | 5.38 |
| Density, g/cc | 0.95 |
| Break Strength, lb/in* | 95/76 |
| Elongation, %* | 3.3/2.5 |
| Modulus, kpsi* | 616/625 |
| Elmendorf Tear, g* | 354/256 |

*data is reported machine direction/cross machine direction.

Example 10

The 4 plys of the paper of Example 7 were calendered to give a nominal 5.75 oz/yd$^2$ basis weight sheet.

The properties of the paper formed were as follows:

| Property | Calendered |
|---|---|
| Basis Weight, oz/yd2 | 6.1 |
| Thickness, mils | 8.5 |
| Density, g/cc | 0.95 |
| Break Strength, lb/in* | 143/136 |
| Elongation, %* | 3.8/3.5 |
| Modulus, kpsi* | 512/595 |
| Elmendorf Tear, g* | 712/674 |

*data is reported machine direction/cross machine direction.

Example 11

The 2 plys of the paper of Example 8 were calendered to give a nominal 3.75 oz/yd$^2$ basis weight sheet.

The properties of the paper formed were as follows:

| Property | Calendered |
|---|---|
| Basis Weight, oz/yd2 | 3.8 |
| Thickness, mils | 5.6 |
| Density, g/cc | 0.91 |
| Break Strength, lb/in* | 87/70 |
| Elongation, %* | 3.7/2.3 |
| Modulus, kpsi* | 465/581 |
| Elmendorf Tear, g* | 284/363 |

*data is reported machine direction/cross machine direction.

Example 12

The 4 plys of the paper of Example 8 were calendered to give a nominal 7.5 oz/yd$^2$ basis weight sheet.

The properties of the paper formed were as follows:

| Property | Calendered |
|---|---|
| Basis Weight, oz/yd2 | 8.2 |
| Thickness, mils | 11.5 |
| Density, g/cc | 0.95 |
| Break Strength, lb/in* | 217/177 |
| Elongation, %* | 4.3/2.5 |
| Modulus, kpsi* | 458/620 |
| Elmendorf Tear, g* | 1167/1092 |

*data is reported machine direction/cross machine direction.

Example 13

Paper was produced as described in Example 3 except IRAGALAN Yellow KWL dye was used and the nominal basis weight of the paper was 2 oz/yd$^2$. The performance of this dye was excellent.

The properties of the paper formed and calendered were as follows:

| Property | Formed | Calendered |
|---|---|---|
| Basis Weight, oz/yd2 | 1.78 | 2.1 |
| Thickness, mils | 11.9 | 3.3 |
| Density, g/cc | 0.20 | 0.84 |
| Break Strength, lb/in* | 9/8 | 44/44 |
| Elongation, %* | 1.5/1.4 | 2.8/2.2 |
| Modulus, kpsi* | 137/125 | 536/687 |
| Elmendorf Tear, g* | 179/172 | 226/155 |
| Gurley porosity, sec | 15 | |
| Color strength, K/S | 2.30 | 2.13 |

*data is reported machine direction/cross machine direction.

The papers reported above were calendered at a temperature of 345–350° C. and 580 pli at a line speed of 20 feet per minute.

Example 14

Paper was produced as described in Example 3 except IRAGALAN Red KWL dye was used and the nominal basis weight of the paper was 2 oz/yd$^2$. The performance of this dye was excellent.

The properties of the paper formed and calendered were as follows:

| Property | Formed | Calendered |
|---|---|---|
| Basis Weight, oz/yd2 | 2.1 | 2.2 |
| Thickness, mils | 14.2 | 3.5 |
| Density, g/cc | 0.20 | 0.84 |
| Break Strength, lb/in* | 9/6 | 35/27 |
| Elongation, %* | 1.4/1.7 | 2.1/2.0 |
| Modulus, kpsi* | 160/85 | 599/504 |
| Elmendorf Tear, g* | 176/188 | 192/225 |
| Gurley porosity, sec | 14 | |
| Color strength, K/S | 2.02 | 2.06 |

*data is reported machine direction/cross machine direction.

The papers reported above were calendered at a temperature of 345–350° C. and 480 pli at a line speed of 20 feet per minute.

Example 15

Paper was produced as described in Example 3 except IRAGALAN Blue 3GL dye was used and the nominal basis weight of the paper was 2 oz/yd$^2$. The performance of this dye was excellent.

The properties of the paper formed and calendered were as follows:

| Property | Formed | Calendered |
|---|---|---|
| Basis Weight, oz/yd2 | 1.7 | 2.0 |
| Thickness, mils | 11.6 | 3.2 |
| Density, g/cc | 0.20 | 0.86 |
| Break Strength, lb/in* | 12/8 | 47/34 |
| Elongation, %* | 1.5/1.6 | 2.6/2.3 |
| Modulus, kpsi* | 175/116 | 628/548 |
| Elmendorf Tear, g* | 178/176 | 175/142 |
| Gurley porosity, sec | 36 | |
| Color strength, K/S | 2.51 | 2.41 |

*data is reported machine direction/cross machine direction.

The papers reported above were calendered at a temperature of 345–350° C. and 580 pli at a line speed of 20 feet per minute.

Example 16

Paper was produced as described in Example 3 except IRAGALAN Black BGL dye was used and the nominal basis weight of the paper was 2 oz/yd$^2$. Also in this Example the content of the fibrids in the paper sheet was increased from 50% by weight to 60%. The performance of this dye was excellent.

The properties of the paper formed and calendered were as follows:

| Property | Formed |
|---|---|
| Basis Weight, oz/yd2 | 2.1 |
| Thickness, mils | 15.7 |
| Density, g/cc | 0.18 |
| Break Strength, lb/in* | 9/8 |
| Elongation, %* | 1.8/2.2 |
| Modulus, kpsi* | 131/98 |
| Elmendorf Tear, g* | 180/184 |
| Gurley porosity, sec | 29 |

*data is reported machine direction/cross machine direction.

This paper was molded into speaker parts at a temperature of 520° F. and a pressure of 2.5 tons.

What is claimed is:

1. A method to make aramid sheet material of various colors and molded parts therefrom comprising the steps of:

(a) forming a solution of m-aramid polymer in a solvent;

(b) extruding the mixture into a nonsolvent under shear conditions to form fibrids;

(c) washing the fibrids in water to remove the solvent;

(d) mixing the wet fibrids with water to dilute the fibrid concentration and adding a dye or pigment to the water fibrid mixture where in the dye or pigment is thermally stable up to or above the glass transition temperature of the m-aramid polymer;

(e) heating the mixture from step (e) for a time sufficient for the fibrid to absorb dye or pigment and develop color;

(f) mixing the colored fibrids with aramid fibers suitable for forming sheet material;

(g) forming and drying the sheet material; and (h) forming a molded part from the sheet material by molding.

2. The method of claim 1 wherein the fibrid is poly(m-phenylene isophthalamide) and the aramid fibers are poly (p-phenylene terephthalamide).

3. The method of claim 1 wherein the fibrid is poly(m-phenylene isophthalamide) and the aramid fibers are poly (m-phenylene isophthalamide).

4. The method of claim 1 wherein the sheet or the part formed is 50% by weight fibrids and 50% by weight aramid fibers.

5. The method of claim 1 wherein the molded art formed is an acoustical device selected from the group consisting of tweeter, mid-range and woofer speaker cones.

* * * * *